(12) United States Patent
Chiu

(10) Patent No.: US 11,957,276 B2
(45) Date of Patent: Apr. 16, 2024

(54) ICE CREAM SCOOP HAVING A HEAT TRANSFER FLUID WITH HIGH SPECIFIC HEAT AND A FLUID STIRRING DEVICE

(71) Applicant: Hao Howard Chiu, Bellevue, WA (US)

(72) Inventor: Hao Howard Chiu, Bellevue, WA (US)

( * ) Notice: Subject to any disclaimer, the term of this patent is extended or adjusted under 35 U.S.C. 154(b) by 184 days.

(21) Appl. No.: 17/649,179

(22) Filed: Jan. 27, 2022

(65) Prior Publication Data

US 2023/0233030 A1 Jul. 27, 2023

(51) Int. Cl.
*A47J 43/00* (2006.01)
*A47J 43/28* (2006.01)
*F28F 3/12* (2006.01)

(52) U.S. Cl.
CPC ............... *A47J 43/282* (2013.01); *F28F 3/12* (2013.01)

(58) Field of Classification Search
CPC ............................ A47J 43/281; A47J 43/282
See application file for complete search history.

(56) References Cited

U.S. PATENT DOCUMENTS

| | | | | | |
|---|---|---|---|---|---|
| 2,160,023 A | * | 5/1939 | Kelly | ............... | A47J 43/282 425/281 |
| 2,166,810 A | * | 7/1939 | Gammeter | ............ | A47J 43/282 219/242 |
| 2,171,606 A | * | 9/1939 | Shultz | ............... | A47J 43/282 D7/681 |
| 2,174,388 A | * | 9/1939 | Myers | ............... | A47J 43/282 D7/681 |
| 2,210,623 A | * | 8/1940 | Kelly | ............... | A47J 43/282 425/281 |
| 2,255,052 A | * | 9/1941 | Green | ............... | A47J 43/281 30/140 |
| 2,560,900 A | * | 7/1951 | Shultz | ............... | A21C 5/00 425/277 |
| 3,299,838 A | * | 1/1967 | Thietje | ............... | A47J 43/282 219/241 |
| 3,513,290 A | * | 5/1970 | Burley | ............... | A47J 43/282 248/37.3 |
| 5,837,296 A | * | 11/1998 | Virkler | ............... | A47J 43/282 425/279 |
| 6,416,309 B1 | * | 7/2002 | Michlitsch | ............ | A47J 43/282 425/279 |

(Continued)

FOREIGN PATENT DOCUMENTS

| | | | | |
|---|---|---|---|---|
| CN | 108308999 A | * | 7/2018 | ............. A47G 21/04 |
| FR | 2861550 A1 | * | 5/2005 | ............... A23G 9/28 |

*Primary Examiner* — Timothy Kennedy

(57) ABSTRACT

An ice cream scoop having a heat transfer fluid with a high specific heat and a fluid stirring device, having: at least one scoop body, which includes a scoop portion with high thermal conductivity and a handle portion that is connected to the scoop portion along the length direction, wherein the handle portion is formed with at least one cavity in communication with the scoop portion; a heat transfer fluid filled in the cavity, the heat transfer fluid having a specific heat higher than that of the scoop portion; at least one group of heat sink fins connected with the cavity, the group of heat sink fins being disposed along the length direction opposite the scoop portion; and at least one fluid stirring device, which is at least partially extended into the cavity so as to facilitate convection of the fluid along the length direction.

8 Claims, 9 Drawing Sheets

(56) References Cited

U.S. PATENT DOCUMENTS

| | | | | |
|---|---|---|---|---|
| 6,846,171 B2 * | 1/2005 | Herbert | ............ | A47J 43/282 |
| | | | | 426/279 |
| 8,814,554 B2 * | 8/2014 | LeGreve | ............ | A47J 43/282 |
| | | | | 425/221 |
| 9,651,311 B2 * | 5/2017 | Hsieh | ............ | A47J 39/02 |
| D909,829 S * | 2/2021 | Angel | ............ | D7/681 |
| 2008/0254178 A1 * | 10/2008 | Allen | ............ | A23G 3/563 |
| | | | | 426/389 |
| 2011/0183025 A1 * | 7/2011 | Funka, Jr. | ............ | A47J 43/282 |
| | | | | 425/279 |
| 2012/0117808 A1 * | 5/2012 | Smalley | ............ | A47J 43/281 |
| | | | | 156/242 |
| 2013/0295216 A1 * | 11/2013 | LeGreve | ............ | A47J 43/282 |
| | | | | 425/279 |
| 2014/0157605 A1 * | 6/2014 | Hsieh | ............ | A47J 36/24 |
| | | | | 29/890.032 |
| 2021/0219786 A1 * | 7/2021 | Laschet | ............ | A47J 43/282 |

* cited by examiner

--Prior Art--

--Prior Art--

ICE CREAM SCOOP HAVING A HEAT TRANSFER FLUID WITH HIGH SPECIFIC HEAT AND A FLUID STIRRING DEVICE

FIELD OF THE INVENTION

The present invention relates to an ice cream scoop, and pertains particularly to a device having a heat transfer fluid with a high specific heat and a fluid stirring device.

BACKGROUND OF THE INVENTION

Ice cream, being one of the most popular desserts in the world, may be transferred from a storage container with the use of spoons. Common spoons with a curved bottom and a narrow handle are well suited for soup and other soft foods. However, using common spoons on frozen ice cream may require a significant cutting force that exceeds the structural strength of the spoons, resulting in bending and deformation. To overcome this problem, ice cream scoops are specifically designed with a thicker handle and a large curved head to facilitate scooping of ice cream. The curvature of the scoop head enables ice cream to be rolled into balls, thus increases efficiency. However, this design still needs improvement.

The ice cream, being hard packed and frozen, often causes ordinary scooper head to not sufficiently penetrate the ice cream. This results in lengthy and repetitive scraping on the surface of the ice cream in order to create a scoopful. In the case of retail establishments, this inefficient motion leads to long lines and agitated customers, and may lead to wrist injuries due to having to exert more strength. Moreover, ice cream tends to melt if not scooped quickly from the container; the milky, sugary concoction breeds bacteria and is unsanitary.

Thus, commercial establishments with many customers often place a tub of water next to the ice cream. After scooping ice cream, the scoop is placed into the tub of water ensuring that the scoop will warm back up from contact with water to facilitate the next scooping action. This method, although simple, poses health risks. Each time the scoop is placed into the tub of water, the water gets contaminated by the ice cream and eventually ends up being the same sugary breeding ground for bacteria. And if tap water is used, the problem of wasteful resources is inevitable. Moreover, due to most scoops being metallic, which outplays other materials in high thermal conductivity and high mechanical strength, however, suffers from the disadvantages of low heat capacity. Hence, metallic scoops are highly sensitive to environmental temperature. With each consecutive placement of the scoop into the water, especially when there is a shorter duration between each placement due to peak hours, the scoop will remain cold and ineffective for scooping ice cream.

To improve upon the heat capacity of an ice cream scoop, U.S. Pat. No. 2,560,900 as shown in FIG. 1, comprises a structure 7, a hallow chamber inside the handle, the chamber holds diluted calcium chloride, using calcium chloride to lower the freezing point, making the liquid harder to freeze. Also using a diverter baffle 70, to separate cold and hot liquids, utilize natural convection to facilitate cold liquid drop back to the handle and warm liquid rising to the scoop. However, this structure is difficult to manufacture to allow convection; also, it should be pointed out, when scooping ice cream, the handle is higher than the scoop, cold liquid actually sinks to the scoop, thus this does not provide any help while scooping; in contrast, after the ice cream is scooped up, while inside the scoop, the scoop elevates above the handle, warm liquid starts rising to the scoop after the fact, melts the already scooped ice cream, making the design unfit for the purpose.

Additionally, because the inside chambers connect with each other, cold and warm liquid convection is both chaotic and intermixed; eventually, the temperature of the liquid inside drops uniformly, decreasing the effectiveness of the scooping action.

Thus, per U.S. Pat. Nos. 4,386,900, 4,553,921 and per FIG. 2 U.S. Pat. No. 8,591,214, both provide methods to warm up the scoop portion using electrical warming components, as an effective way to soften ice cream. However, these types of electrical heating present a myriad of problems: in terms of manufacturing, internal electrical warming components add to the material and production cost and require safety testing and additional third-party certification, to finally rise the end consumer cost; in actual usage, electrical components require electrical source, either through electrical plugs or through batteries, which lead to inconveniences, especially considering that consumers do not like to use or clean electrical devices in wet environments; further, temperature control of electrical components are difficult to be timely and precise, may be too high and melt ice cream too quickly; lastly, the ice cream scoop 8 per FIG. 2, comprises a ceramic base, user can depress button 84 to control heating coil 82, and to increases the temperature of the ceramic scoop portion 80 before scooping, but in actual use, considering the fragile ceramic material and the added motion to depress a button, additional attention should be invested to refrain from the accidental drop of the scoop. In summary, although the above embedded electrical scoops may be more efficient in providing heat, but in consideration of many drawbacks, these types of scoops are not ideal solutions.

The advent of technology occurs in consideration of human nature. As such, the present invention provides apparatus and method for a new and improved ice cream scoop that is simpler in construction, easier to use, and maintains the temperature of the liquid inside the handle without any supplementary energy, that allows continuous, risk-free, easier scooping action.

SUMMARY OF THE INVENTION

The purpose of the present invention is to provide an ice cream scoop, by drawing from a high thermal conductive region in the scooper handle, to transfer heat from the heat transfer fluid, to soften the surface of the ice cream and to facilitate the scooping action.

Another purpose of the invention is to provide an ice cream scoop, by effectively stirring the heat transfer fluid via the fluid stirring device, to maintain the temperature inside the scoop handle and to allow continuous, uninterrupted use.

Another purpose of the invention is to provide an ice cream scoop, by effectively stirring the heat transfer fluid via the fluid stirring device, to circulate the fluid and provide thermal exchange with the heat sink fins, so as to absorb external heat and to reduce temperature loss inside the scoop handle.

It is still another purpose of the invention to provide an ice cream scoop, back and forth motion by gravity via the natural motion of scooping ice cream, so as to effectively stir the fluid, while completely avoid the use of additional external electrical energy sources and simplifying the design of the scoop.

It is still another purpose of the invention to provide an ice cream scoop, by encapsulating the scoop handle in a wrapping piece having a lower thermal conductivity coefficient, to provide protection to the user from the discomfort of directly contacting cold surfaces.

It is still another purpose of the invention to provide an ice cream scoop, to use transparent material as the wrapping piece, and to set up a view portion, to allow the observation of the fluid stirring device in motion, and add to the enjoyment of using the scoop.

It is still another purpose of the invention to provide an ice cream scoop, to use a transparent material as the wrapping piece, to allow clear visual observation of the symbols etched onto the surface of the fluid stirring device, to provide customizable branding and marketing identification.

It is still another purpose of the invention to provide an ice cream scoop, to arrange the heat sink fins into an arc-shaped fringe, to prevent sharp edges from injuring any persons and to promote safety.

To achieve the above purposes, the present invention provides an ice cream scoop, for the purpose of scooping frozen foodstuff (such as ice cream) from containers, to reduce the effort required to scoop and increase efficiency, such ice cream scoop having a heat transfer fluid with a high specific heat and a fluid stirring device comprising: at least one scoop body, which includes a scoop portion with high thermal conductivity and a handle portion that is connected to the scoop portion along a length direction, wherein the handle portion is formed with at least one cavity in communication with the scoop portion; a fluid filled in the cavity, the fluid having a specific heat higher than that of the scoop portion; at least one group of heat sink fins connected with the cavity, the group of heat sink fins being disposed along the length direction opposite the scoop portion; and at least one stirring device, which are at least partially extended into the cavity so as to facilitate convection of the fluid along the length direction.

Accordingly, with the present invention providing an ice cream scoop, users can easily scoop ice cream by the scooper body of high thermal conductivity; additionally, by a heat transfer fluid filled cavity within the handle portion, the heat transfer fluid having a specific heat higher than that of the scoop portion; by effectively stirring the heat transfer fluid via the fluid stirring device, to circulate the fluid and provide thermal exchange with the heat sink fins, so as to absorb external heat and to reduce temperature loss inside the scoop handle, without any additional external electrical source, with simple and safe construction.

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

The above statements related to the present invention, other technical contents, features and benefits will be clearly presented in the detailed illustration for the preferred embodiments as shown in the diagrams. Besides, the same assembly in these embodiments will be represented by similar symbols.

Figure 1:
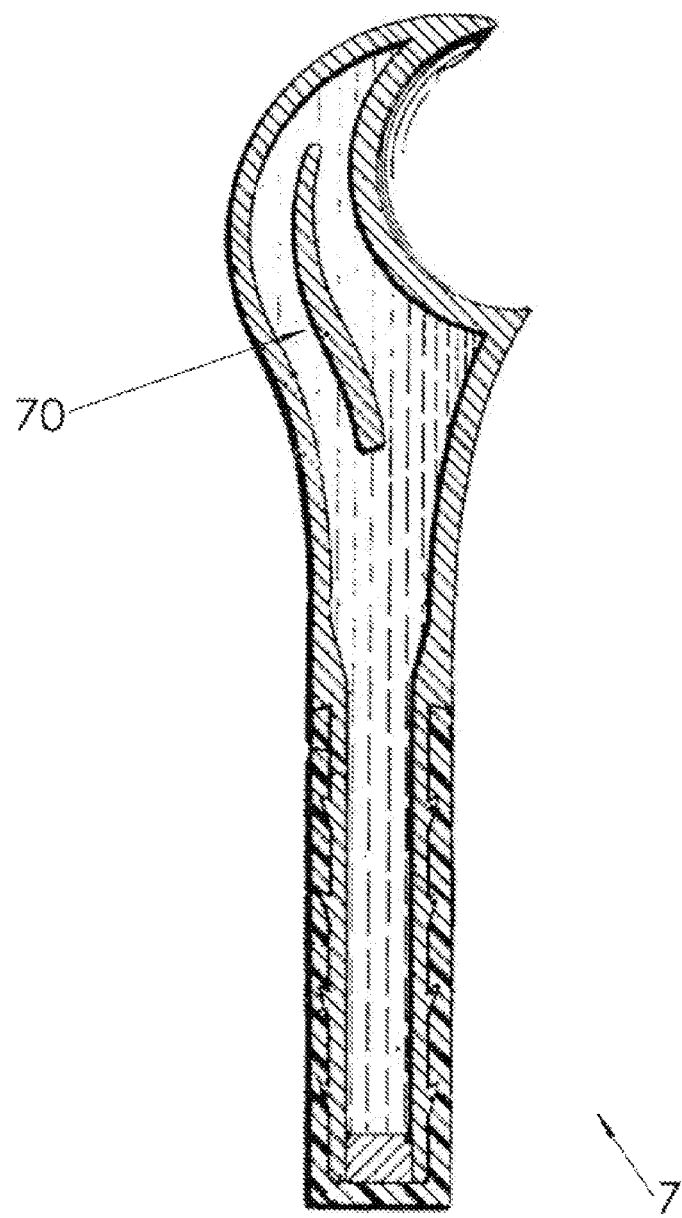
FIG. 1 is the schematic of a prior art.
Figure 2:
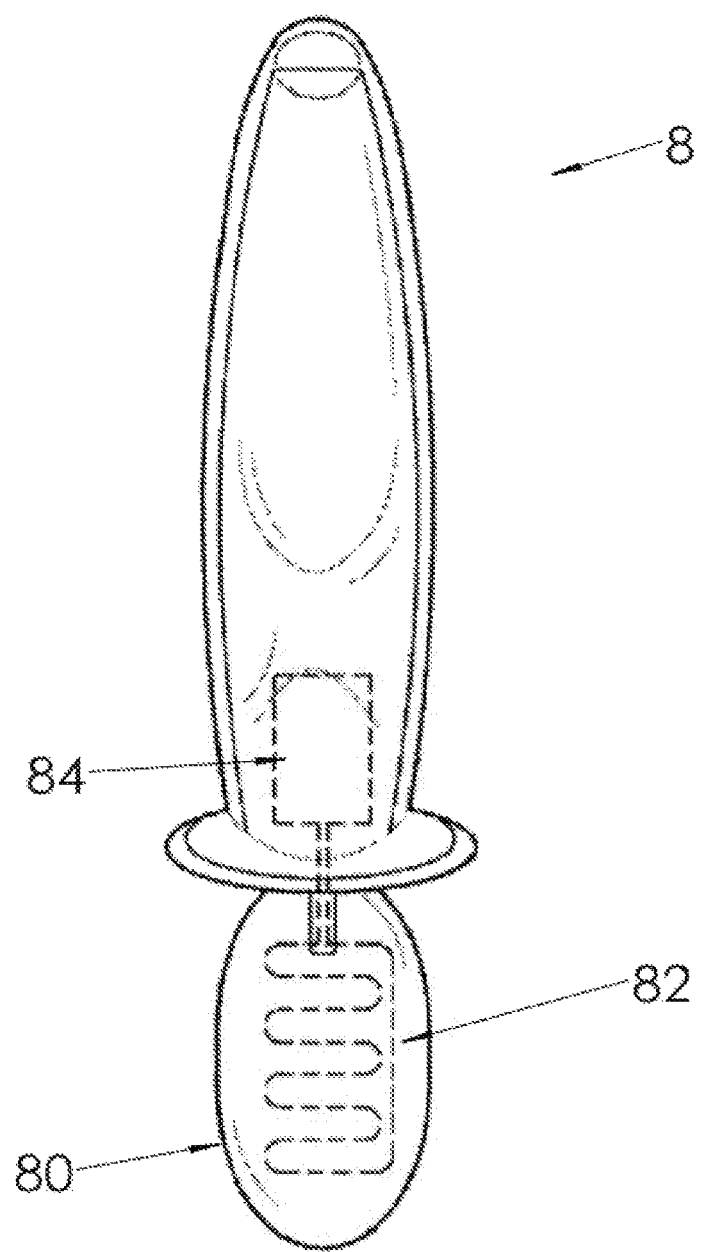
FIG. 2 is the schematic of another prior art.
Figure 3:
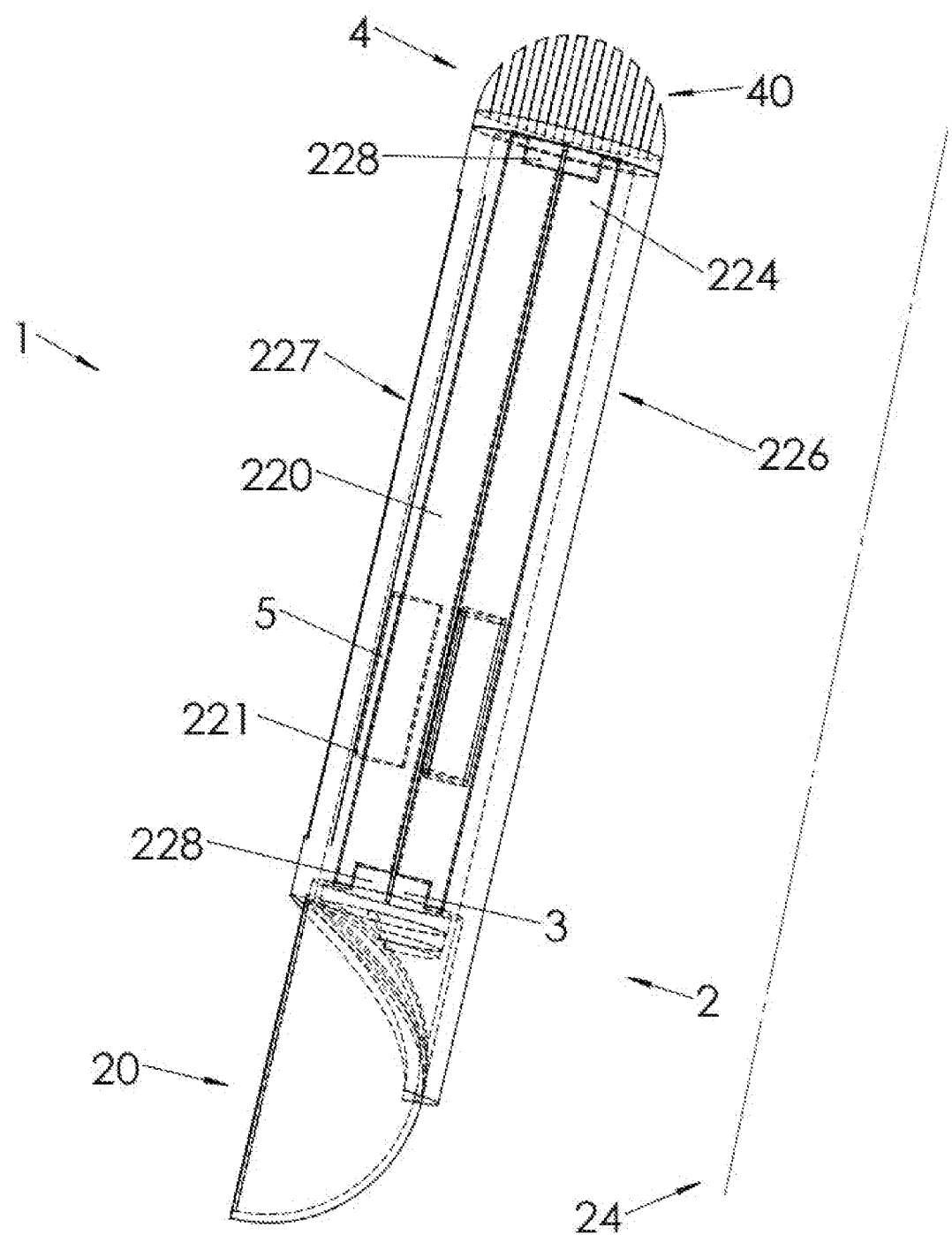
FIG. 3 is the perspective schematic diagram of the present invention in the first preferred embodiment, illustrating the heat transfer fluid with a high specific heat and a fluid stirring device.
Figure 4:
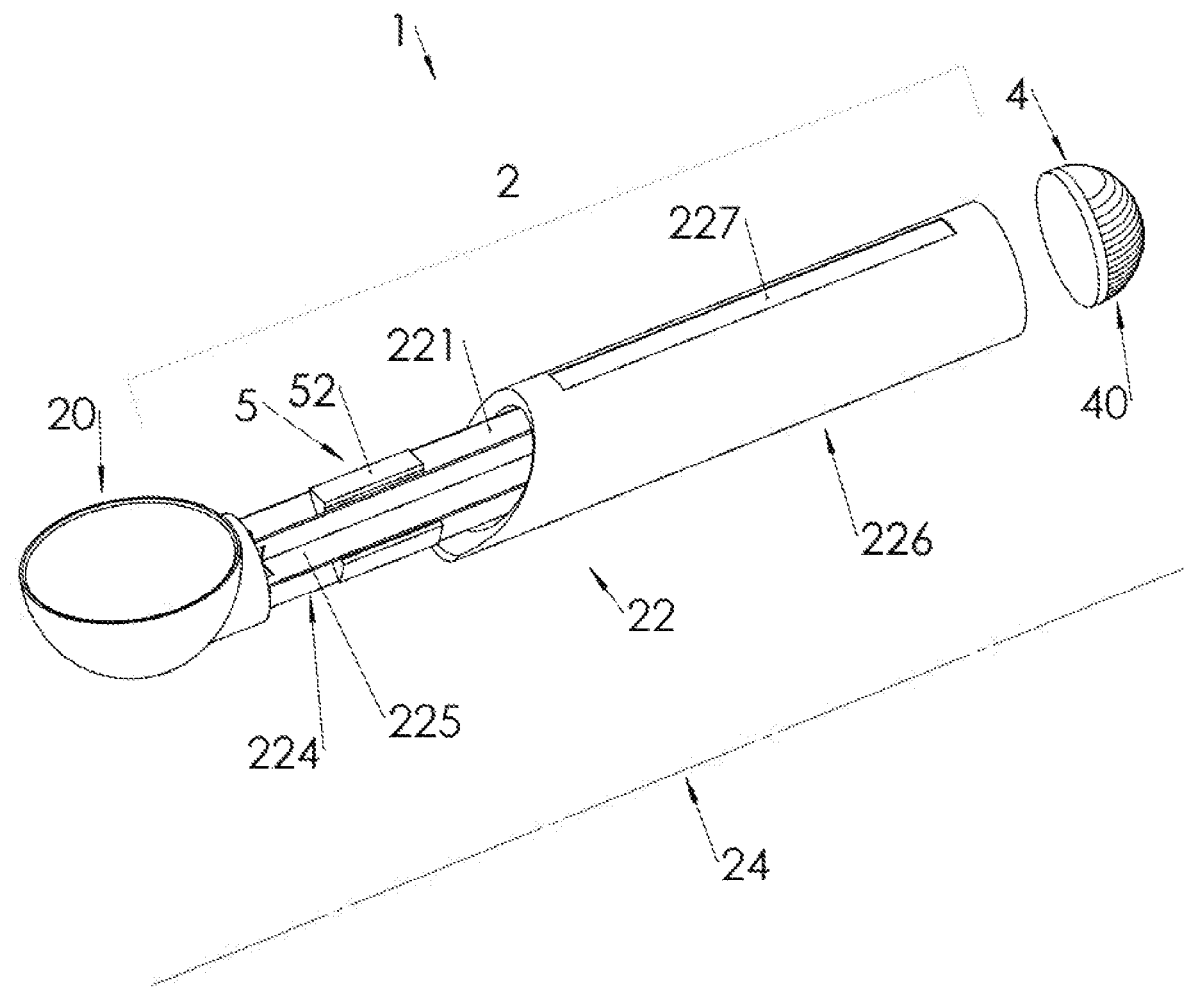
FIG. 4 is the schematic diagram of internal disassembly view of FIG. 3, illustrating the internal structures.
Figure 5:
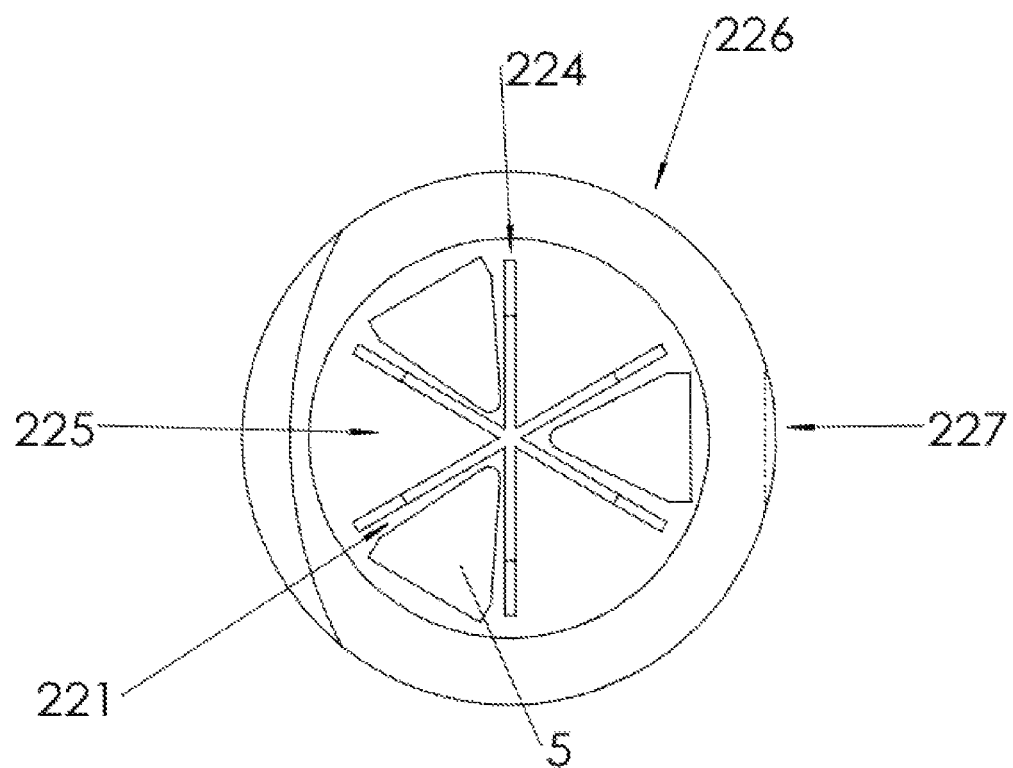
FIG. 5 is the cross-sectional view of FIG. 3
Figure 5:
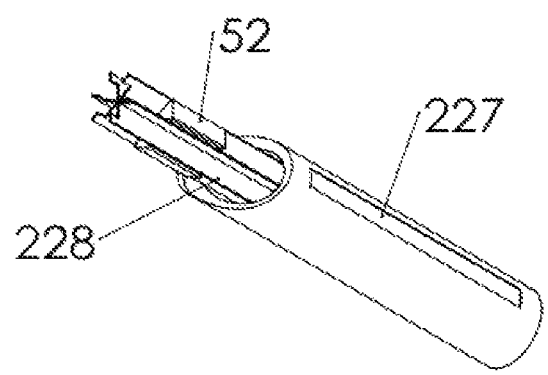

With reference to the present invention, the first preferred embodiment as shown in FIGS. 3-5 comprises an ice cream scoop 1 having a heat transfer fluid with a high specific heat and a fluid stirring device, using heat from the high thermal conductivity handle portion, mainly comprising a scooper body 2, the scooper body 2 further comprising, along the length direction 24, a scoop portion 20 and a handle portion 22, of course the handle portion 22 can be lengthened with sound engineering judgement, in this embodiment, the handle portion 22 is a hallow tube formed into a cavity 220, the cavity filled with a heat transfer fluid 3 with specific heat higher than that of the scoop portion 20, in this embodiment the heat transfer fluid 3 is such as distilled water, of course other safe and effective fluid material can be chosen: the end of the handle portion 22 is connected to one group of heat sink fins 4, the heat sink fins 4 may be attached to the handle using a threaded connection, a "slip fit" or any method chosen with sound engineering judgement, within the handle portion 22 there is at least one fluid stirring device 5, an acrylate polymer wrapping piece 226, of course other materials, having a lower thermal conductivity than the scoop portion 20 may be chosen, that which allows ambient light to penetrate and pass through the wrapping piece 226 and the transparent portion 227.

In the present embodiment, the handle portion 22 is positioned between the scoop portion 20 and the heat sink fins 4, by the scoop portion 20, the handle portion 22 and the heat sink fins 4, encapsulates the cavity 220. A guide groove member 224 is affixed within the cavity 220, the guide groove member 224 is defined as a radial, symmetrical six-leaf structure, as such divides the hollow cavity 220 into six isometric channels, the cavity 220 terminates in a convection cavity 228 at the scoop portion 20 and also at the heat sink fins 4, the convection cavity 228 allows the heat transfer fluid 3 to circulate within the guide groove member 224. The present embodiment further defines each of the three triangular pillar shaped devices as the fluid stirring devices 5, each of the three devices is installed at three of the six triangular shaped guide groove member 224 along the length direction 24, with an empty channel between the three fluid stirring devices 5. For the purpose of clarity and illustration, each channel is denoted as a guide chute 221, due to the loose fit between the fluid stirring devices 5 and the guide groove member 224, the fluid stirring devices 5 can move along the guide chute 221 by the force of gravity, accordingly the fluid stirring devices 5 can move downward when the scoop portion 20 points down in the act of scooping, and the fluid stirring devices 5 can move up when the scoop portion 20 lifts up and away after scooping, to perform a reciprocating sliding motion.

In the present embodiment, the guide groove member 224 and the wrapping piece 226 combine to form six triangular chutes, exactly three guide chutes 221 accommodate the aforementioned triangular pillar shaped devices, and the other three chutes are free of any devices to act as convection chutes 225, during actual use, the user can apply force by holding the wrapping piece 226, to allow the scoop portion 20 to dig down into the ice cream; when the ice cream is in contact with the scoop portion 20, the scoop portion will cool down, the heat transfer fluid 3 inside the cavity 220 will help the scoop portion warm back up; and as the scoop portion 20 points downward in a digging motion, by gravity the fluid stirring devices 5 slides towards the scoop portion, pushing the heat transfer fluid 3 inside the guide chutes toward the scoop portion 20, thus allowing the slightly cooled heat transfer fluid 3 near the scoop portion 20 to push into the convection chutes 225, and flow towards the heat sink fins 4, to accomplish thermal exchange, thus return the heat transfer fluid 3 back to the ambient room temperature; conversely, when the scoop portion 20 is pointing up, the fluid stirring devices 5 slides toward the heat fins 4 along the length direction 24, pushing the heat transfer fluid 3 inside the guide chutes 221 into the convection chutes 225, by this simple and controllable convection method, effectively promote the rate of thermal exchange, using the high specific heat property of the heat transfer fluid 3 to keep the temperature of the scoop portion 20 from dropping too quickly down to the freezing point, and let the heat sink fins 4 absorb heat from the ambient environment, through the convection of the heat transfer fluid 3, transfer and maintain a steady temperature at the scoop portion 20.

Through the structural design of the present invention, not only is it free of internal electrical components, thus simplifying the structure of the ice cream scooper and lowering the cost of production and inspection, but also free of the hassles of electrical cords or have to change batteries; the highest temperature of the scoop portion 20 is limited by the ambient temperature provided by the heat sink fins 4, making it impossible to overheat the scooping portion and melting ice cream, the gravity-induced agitation provided by the fluid stirring devices 5, allows long lasting softening and easier scooping ice cream, prevents the scoop portion 20 from easily reach thermal equilibrium with the cold ice cream thus rendering it ineffective to scoop, compare to the prior art whereby a heat transfer fluid with a high specific heat is build-in to the ice cream scooper, generally when the ice cream scooper is used greater than 100 times consecutively, the scooper portion reaches equilibrium with the ice cream; this invention can effectively prolong consecutive use to more than 300 times.

In the present embodiment, because the wrapping piece 226 is an acrylate polymer, through the transparent portion 227, the user can directly observe the fluid stirring devices 5 sliding back and forth, it is further defined that the fluid stirring devices 5 corresponding to the transparent portion 227 as a view portion 52, customization is achieved via special logo, diagram and lettering; or a customer copyrighted phrase or specially designed pattern. In addition, the heat sink fins 4 with an arc-shaped fringe 40 not only increases surface contact with ambient air, but also prevents accidental scratching, it is an ice cream scooper that is effective for prolonged use.

Figure 6:
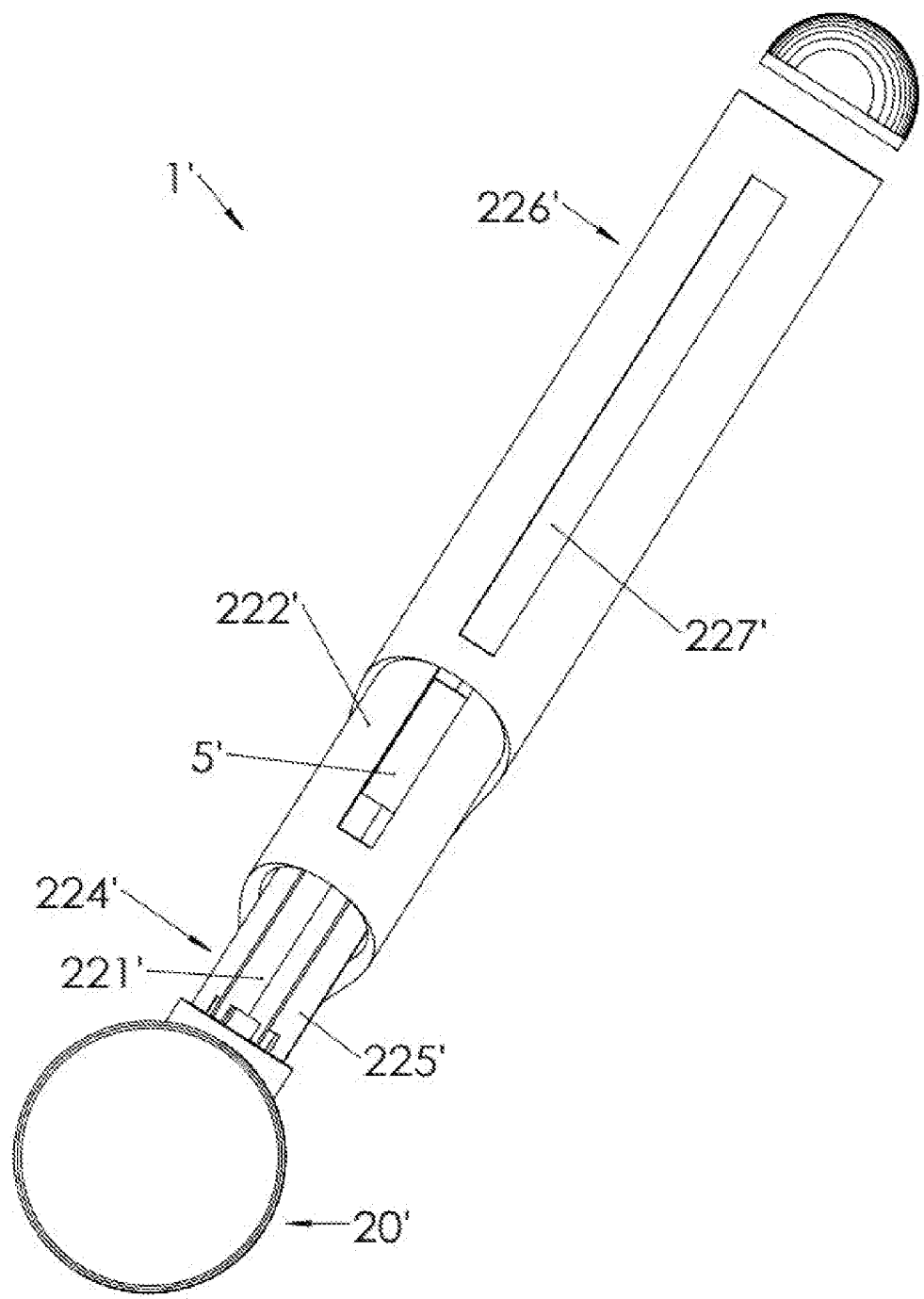
FIG. 6 is the perspective schematic diagram of the present invention in the second preferred embodiment.
Figure 7:
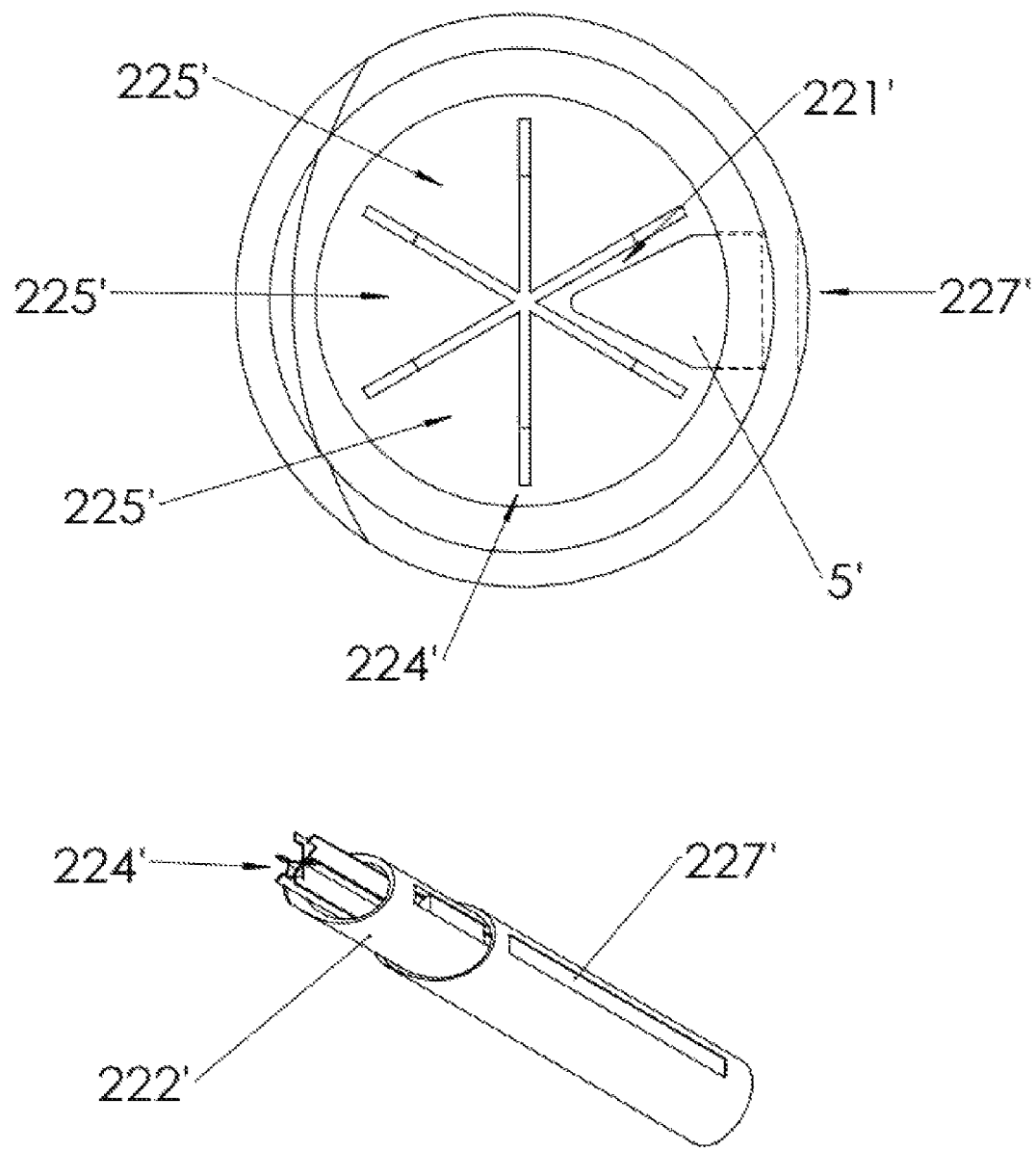
FIG. 7 is the schematic diagram of internal disassembly of FIG. 6.

The second preferred embodiment of the present invention is shown in FIGS. 6-7, wherein between the wrapping piece 226' and the guide groove member 224', a thermally conductive liner 222', is added to provide an additional thermal conduction pathway from the heat sink fins 4' to the scooping portion 20' and back; the guide groove member 224' are inserts, the heat sink fins 4' is removable, allowing the heat transfer fluid 3' with high specific heat to be replaced; in reference to the guide groove member 224', the present embodiment keeps the same hexagonal structure as the previous embodiment, but only a single guide groove member is used as a guide chute 221', allowing a single fluid stirring device 5' to travel back and forth, thus in the present embodiment, there are five chutes designated to be convection chutes 225', in fact, observation through experimental data is needed to find the best structural design that promotes fluid convection, the present embodiment is only one possible method. To allow visual observation of the fluid stirring device 5', the present embodiment specifies that only the transparent portion 227' of the wrapping piece 226' must correspond to the path where the stirring device 5' moves back and forth, while the rest of the cladding can be any arbitrary colored thermal insulating plastic material, thereby add to the exterior aesthetics of the scooper.

Figure 8:
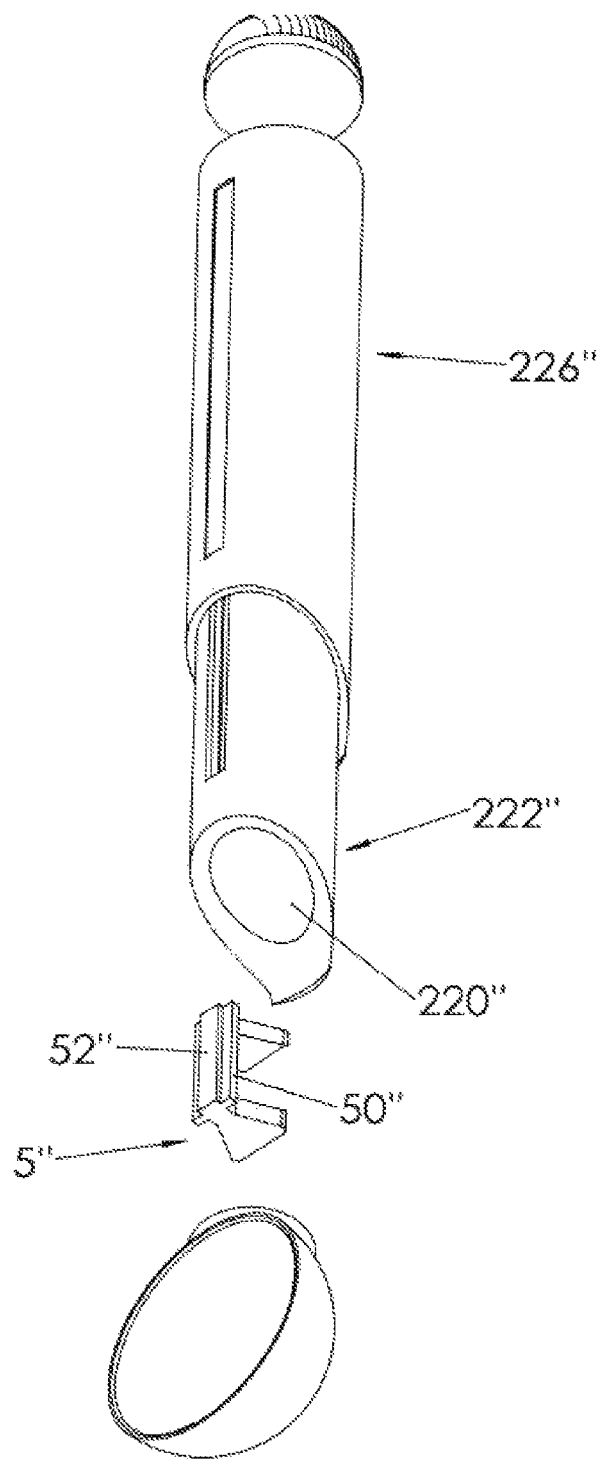
FIG. 8 is the perspective schematic diagram of the present invention in the third preferred embodiment.
Figure 9:
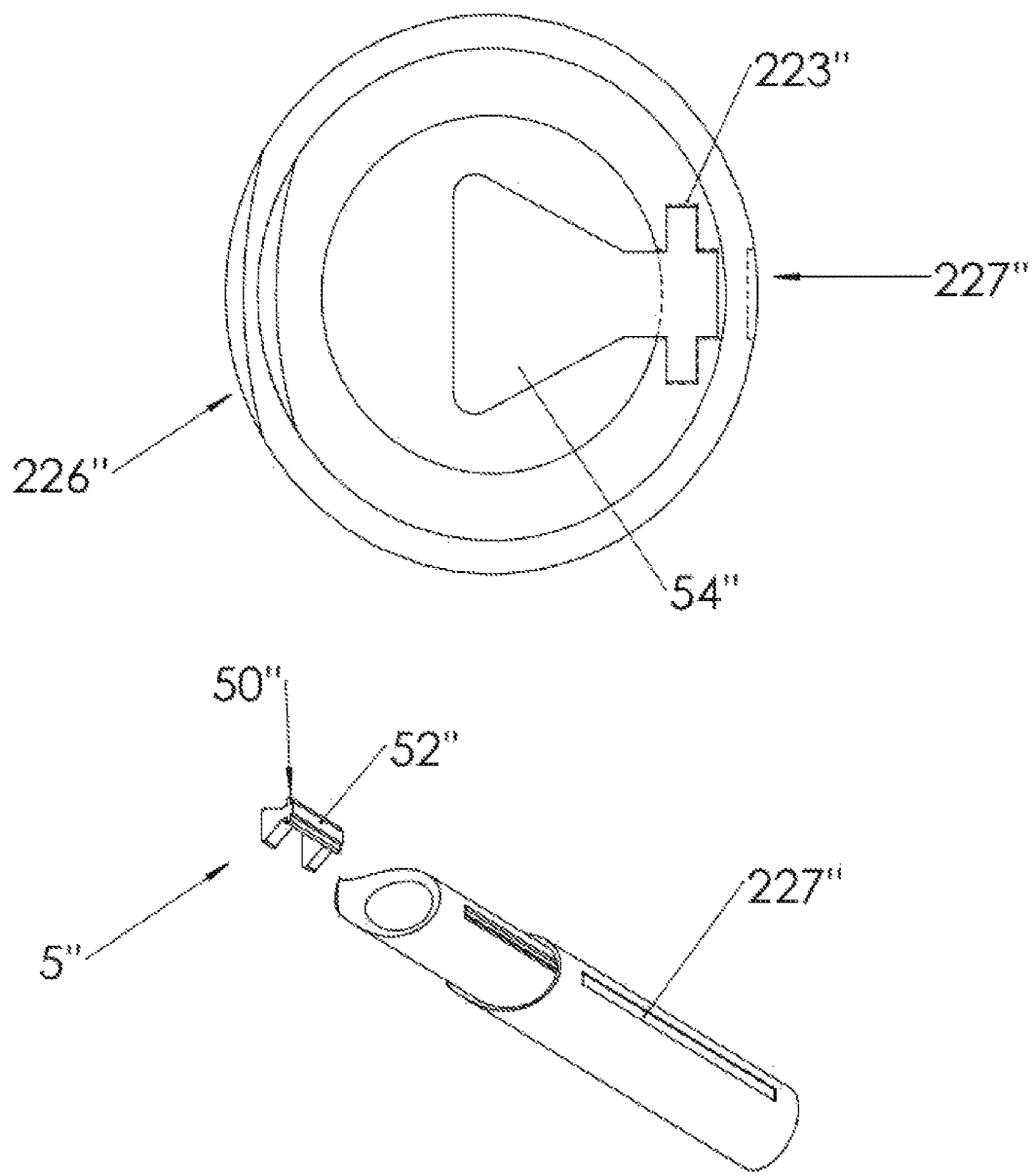
FIG. 9 is the schematic diagram of internal disassembly of FIG. 8.

Of course, to those skilled in the relevant art, it is not completely necessary to install guide chutes in the handle portion of the present invention, as shown in FIGS. 8-9, of the third preferred embodiment of this invention, wherein a thermally conductive liner 222" together with a wrapping piece 226", define a cavity 220", and directly design a guide rail as part of the thermally conductive liner 222", to form a dovetail-shaped groove 223" which enables a fluid stirring device 5" to glide back and forth, by this design, more space is available within the hollow cavity 220", to accommodate more fluid, the structure of the fluid stirring device 5", apart from the original view portion 52", a guide sliding member 50" accompanies the dovetail-shaped groove 223" and extend into the cavity 220" for the purpose of stirring, the paddling element 54", the guide sliding member 50" and the dovetail-shaped groove 223" are loose-fitting, this enables the whole fluid stirring device 5" to travel back and force along the length direction. The fluid stirring device 5" in this embodiment does not have a big surface area of contact with the thermally conductive liner 222", therefore has a better chance for increased glide efficiency due to a decrease in friction. While the invention has been described with reference to the preferred embodiments above, it should be recognized that the preferred embodiments are given for the purpose of illustration only and are not intended to limit the scope of the present invention, and various modifications as well as changes, which will be apparent to those skilled in the relevant art, may be made without departing from the spirit and the scope of the invention.

What is claimed is:

1. An ice cream scoop, comprising:
    at least one scooper body, which includes a thermally conductive scoop portion and a handle portion that is connected to the scoop portion along a length direction, wherein the handle portion is formed with at least one cavity in communication with the scoop portion;
    a heat transfer fluid filled in the cavity, the heat transfer fluid having a specific heat higher than that of the scoop portion;
    at least one group of heat sink fins connected with the cavity, the group of heat sink fins being disposed along the length direction opposite the scoop portion; and
    at least one stirring device, which is at least partially extended into the cavity so as to facilitate convection of the fluid along the length direction;
    wherein the handle portion is formed with a guide chute extending along the length direction, such that the fluid stirring device moves reciprocally in the guide chute.

2. The ice cream scoop according to claim 1, wherein the handle portion includes a wrapping piece extending along the length direction.

3. The ice cream scoop according to claim 2, further comprising a thermally conductive liner wrapped by the wrapping piece, wherein a thermal conductivity of the wrapping piece is lower than that of the scoop portion.

4. The ice cream scoop according to claim 3, wherein the thermally conductive liner is a hollow metal tube, the thermally conductive liner and the wrapping piece jointly forming a dovetail-shaped groove along the length direction; and the fluid stirring device has a guide sliding member held in the dovetail-shaped groove and at least one paddling element that is formed by the guide sliding member bent and extended into the cavity.

5. The ice cream scoop according to claim 2, wherein the handle portion further includes at least one guide groove member disposed in the cavity, the guide groove member and the wrapping piece jointly defining the at least one guide chute.

6. The ice cream scoop according to claim 5, wherein the guide chute and/or the wrapping piece further form a convention chute parallel to the guide chute, and the guide chute and the convection groove communicate with each other in a head-to-tail manner at positions corresponding to the scoop portion and the heat sink fins.

7. The ice cream scoop according to claim 2, wherein the wrapping piece is at least partially provided with a transparent portion, and the fluid stirring device has a view portion corresponding to the transparent portion.

8. The ice cream scoop according to claim 1, wherein the heat sink fins have a plurality of fin bodies extending parallel to each other along the length direction, and tips of the fin bodies distant from the scoop portion jointly form an arc-shaped fringe.

* * * * *